Sept. 17, 1957   J. W. BRYAN, SR., ET AL   2,806,600
SEPARATOR FOR SEPARATING GRANULAR POULTRY
FEED FROM POULTRY BEDDING Filed Oct. 11, 1955   4 Sheets-Sheet 4

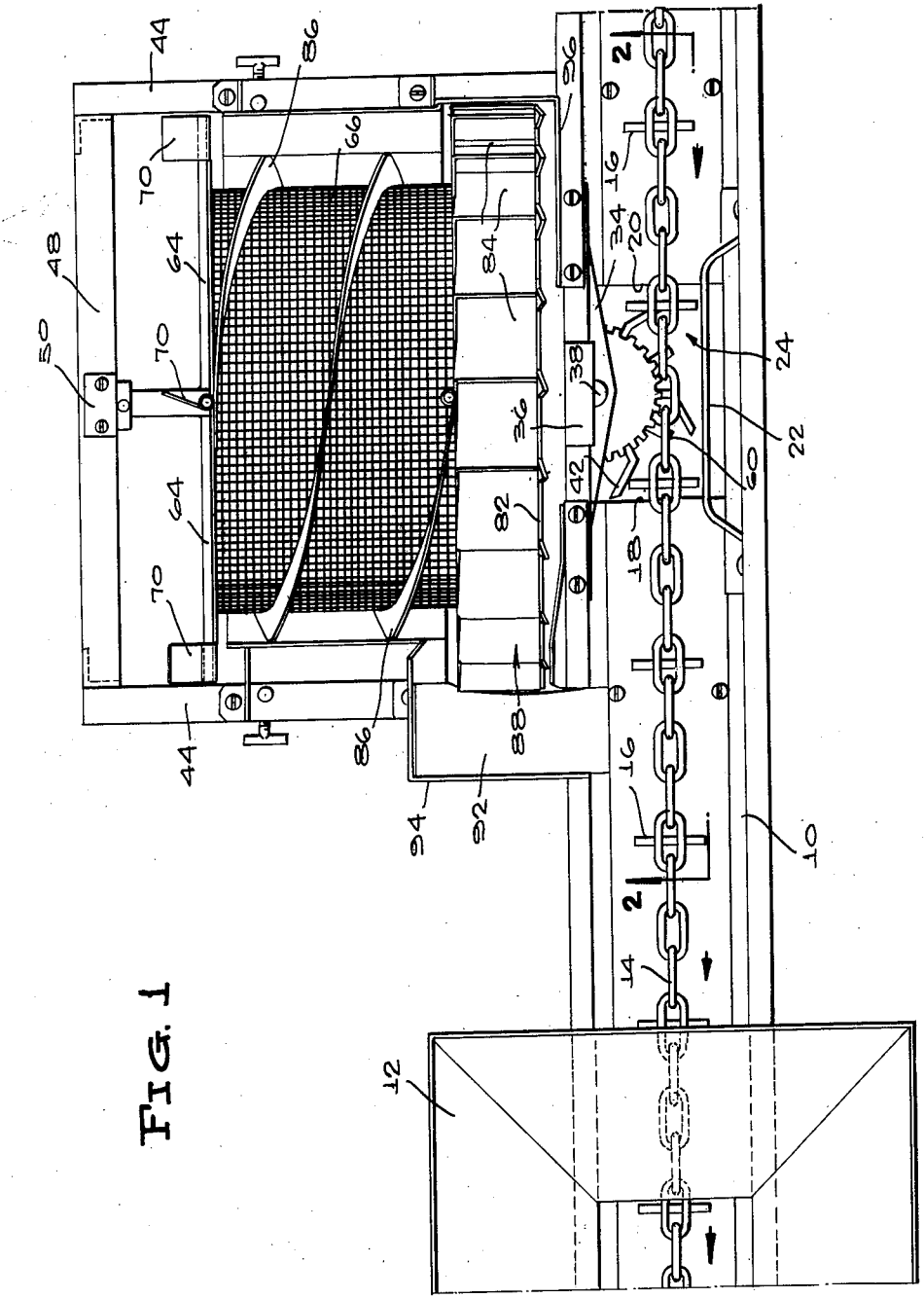

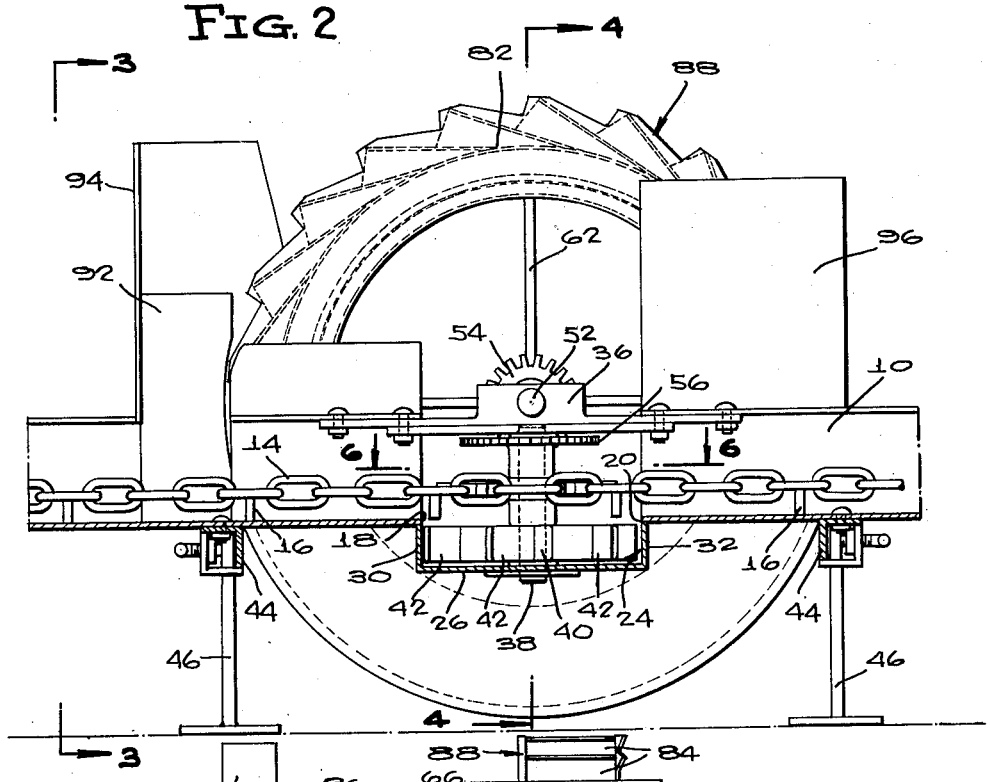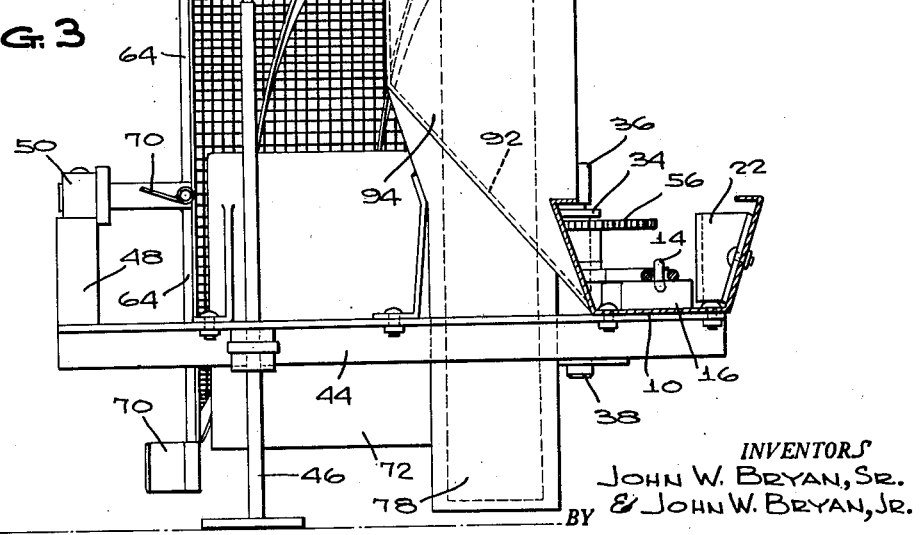

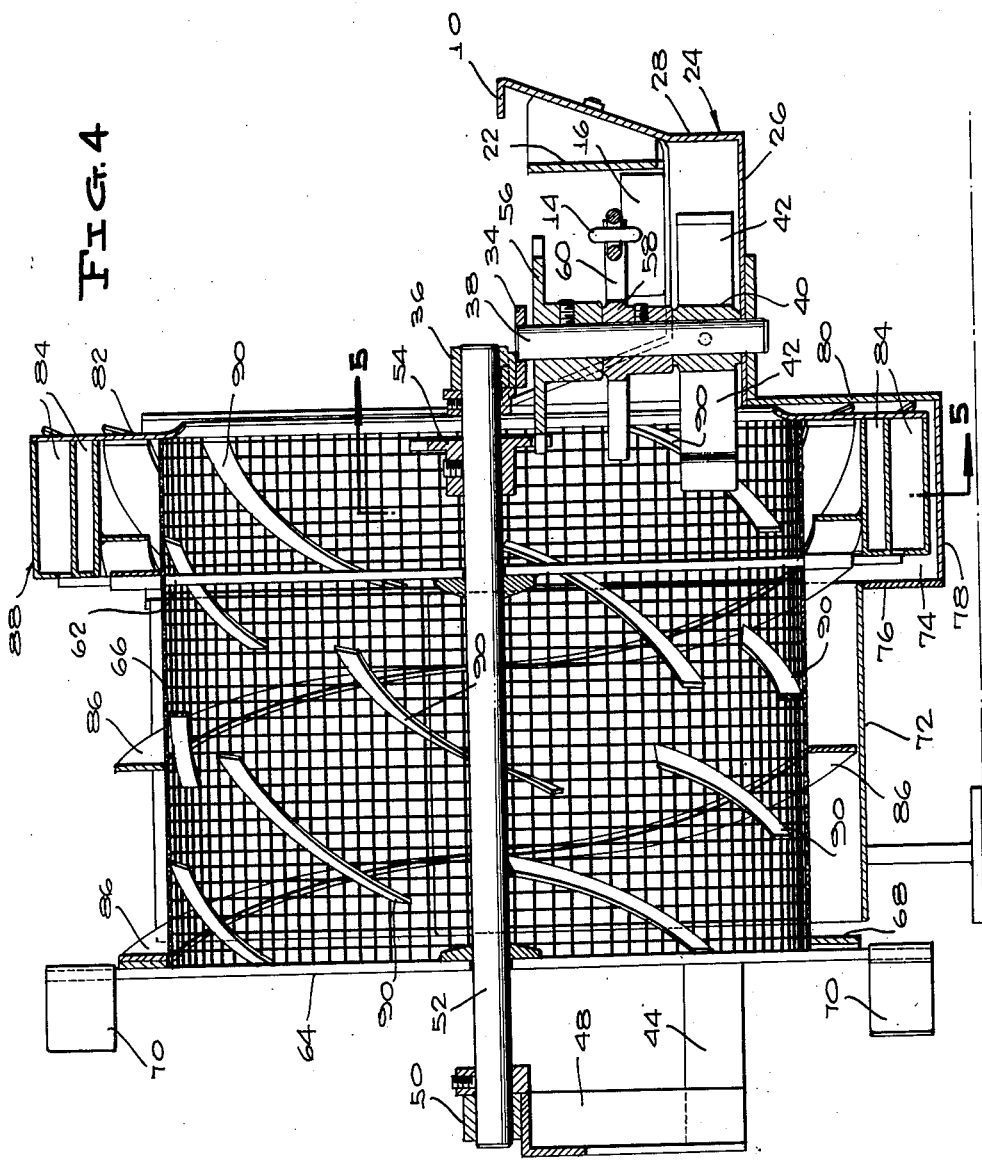

INVENTORS
JOHN W. BRYAN, SR.
& JOHN W. BRYAN, JR.
BY
McMorrow, Berman + Davidson
ATTORNEYS

United States Patent Office 2,806,600
Patented Sept. 17, 1957

2,806,600

SEPARATOR FOR SEPARATING GRANULAR POULTRY FEED FROM POULTRY BEDDING

John W. Bryan, Sr., and John W. Bryan, Jr., Traphill, N. C.

Application October 11, 1955, Serial No. 539,860

1 Claim. (Cl. 209—235)

This invention relates to a separator for separating poultry feed from poultry bedding material and has for its primary object to deliver clean poultry feed to a poultry feeding trough of the type comprising an endless channel through which moves a chain carrying scrapers which engage the bottom of the channel and distribute poultry feed in said channel.

In feeders of the type above referred to, the young chicks in their eagerness to get at the food in the trough will frequently dispose bedding material such as shavings in the feeding trough so that the shavings become mixed with the feed and tend to prevent at least some of the chicks from gaining access to the feed.

Another object of this invention is to render accessible to all of the chicks feeding at the trough the granular feed being distributed therein by the scraper blades carried by the chain as it moves through the trough.

Still another object is to remove the shavings from the feeding trough just prior to the automatic deposit of granular feed therein so as to avoid clogging the feed trough with shavings and the like and the consequent interference with the proper deposit of feed in the feed trough.

The above and other objects may be attained by employing this invention which embodies among its features a foraminous cylinder mounted to rotate about a substantially horizontal axis, a substantially semicircular trough mounted beneath said cylinder in concentric spaced relation thereto, means mounted adjacent one end of the cylinder for delivering thereinto feed and bedding material to be separated, means mounted adjacent the cylinder and operatively connected thereto for rotating said cylinder and tumbling the feed and bedding material to cause the feed to pass through the cylinder and into the trough, an elevator carried by the cylinder adjacent the end thereof into which the feed and bedding material is introduced for dipping into the trough and elevating the feed deposited therein above the cylinder and discharging it, and a helical vane carried by the cylinder and extending outwardly from the periphery thereof for engaging feed deposited in the trough and advancing it toward the elevator as the cylinder rotates.

Other features include helical vanes carried by the cylinder and extending inwardly thereinto for engaging the bedding material and directing it through the end of the cylinder remote from the end thereof through which the feed and bedding material is fed.

Other features include a shaft mounted for rotation about a vertical axis adjacent the feed and bedding material delivering means in intersecting relation to the axis of the cylinder, means carried by the shaft and entering the feed and bedding material delivering means for delivering feed and bedding material from the delivering means into the interior of the cylinder, means carried by the shaft for rotating it, and means carried by the shaft and operatively connected to the cylinder for causing the cylinder to rotate as the shaft is rotated.

Still other features include means carried by the shaft and engageable with the endless chain of a conventional endless chick feeding trough for rotating the shaft as the chain moves through said trough for distributing feed therein.

Still other features include a chute mounted adjacent the cylinder and having its discharge end disposed in the chick feeding trough for receiving feed carried by the elevator and delivering it to the chick feeding trough.

In the drawings:

Figure 1 is a top plan view of a separator embodying the features of this invention showing it connected to a conventional endless chick feeding trough through which moves the feed distributing chain in a closed path;

Figure 2 is a sectional view taken substantially along the line 2—2 of Figure 1;

Figure 3 is a sectional view taken substantially on the line 3—3 of Figure 2;

Figure 4 is an enlarged sectional view taken substantially on the line 4—4 of Figure 2;

Figure 5:
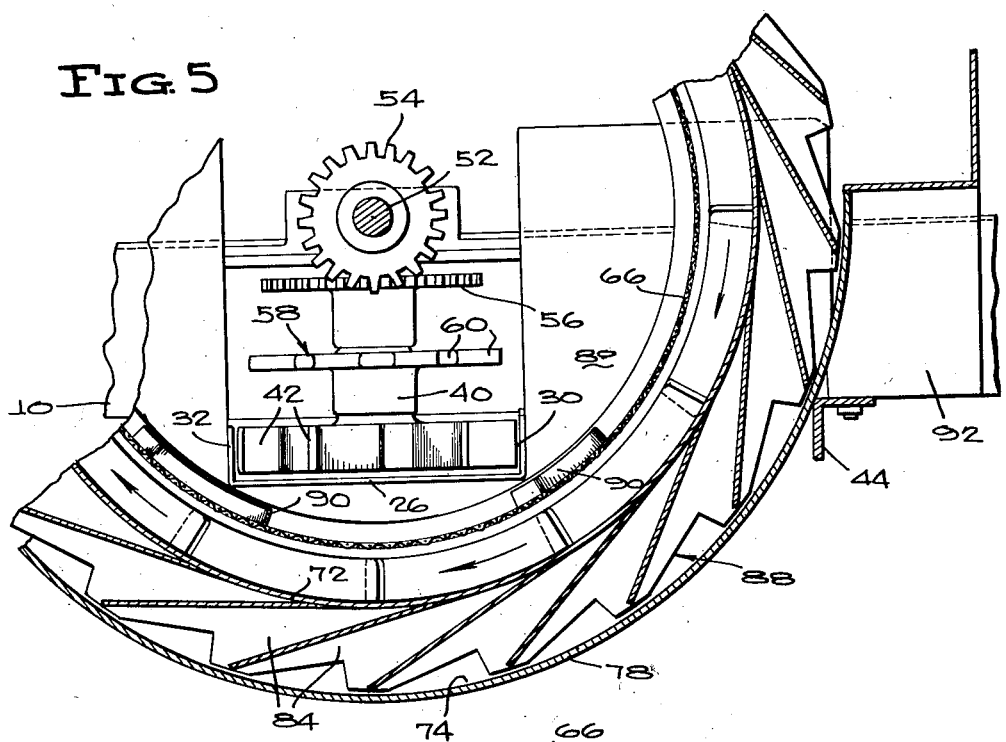
Figure 5 is a fragmentary enlarged sectional view taken substantially on the line 5—5 of Figure 4.
Figure 6:
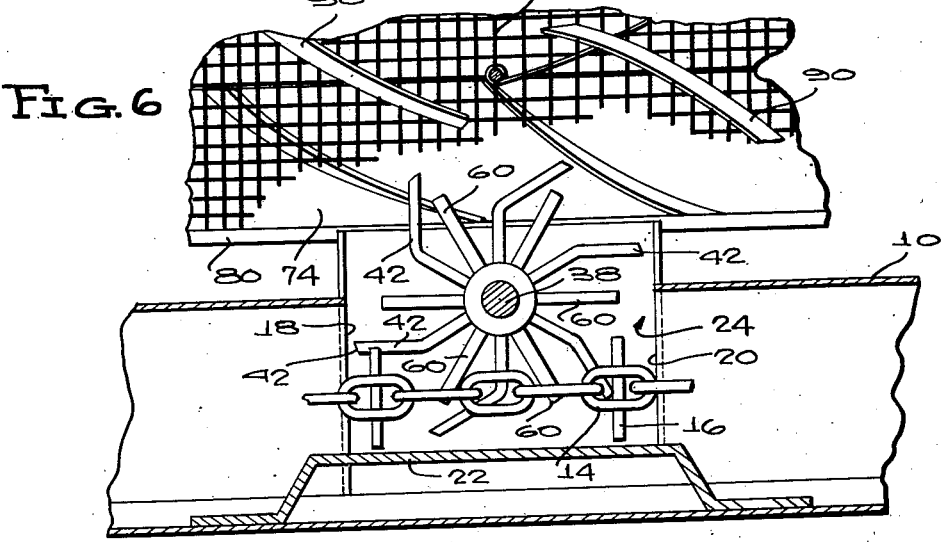
Figure 6 is an enlarged fragmentary sectional view taken substantially on the line 6—6 of Figure 2.

Referring to the drawings in detail, an endless feed trough 10 of conventional form is provided with a feed delivering hopper 12 and mounted to move in a closed path through said trough is an endless chain 14 carrying downwardly extending scrapers 16 which ride along the bottom of the trough 10 to distribute the feed delivered to the trough through the hopper 12. The structure so far described forms no part of this invention except in combination therewith.

Adjacent the hopper 12 the trough 10 is severed to define ends 18 and 20 and secured to one side of the trough and extending inwardly toward the center thereof in bridging relation to the severed portions 18 and 20 is a guide member 22 which prevents the chain 14 from moving laterally on one side of its path of movement.

Carried by the ends 18 and 20 of the trough 10 is a receiver designated generally 24 comprising a bottom 26, an end wall 28 and side walls 30 and 32 (Fig. 2), which walls are secured to the end edges of the trough 10 adjacent the cut-away portion thereof. From the foregoing, it will be obvious that the receiver 24 is provided with an open side, the purpose of which will hereinafter appear.

Extending transversely across the receiver 24 adjacent the open side thereof and in spaced relation to the bottom 26 is a bridge piece 34 carrying midway between opposite ends a bearing 36, the axis of which extends horizontally. Mounted for rotation in the bottom 26 of the receiver 24 and in the bridge piece 34 is a shaft 38 which rotates about a vertical axis which intersects the horizontal axis of the bearing 36, as will be readily understood upon reference to the drawings. Secured to the shaft 38 for rotation therewith adjacent the bottom 26 of the receiver 24 is a hub 40 carrying outwardly extending arms 42 which, when the shaft 38 is rotated, pass across the upper surface of the bottom 26 to sweep granular feed and bedding material that has been deposited in the receiver from the trough 10 through the open side of the receiver. Secured to the underside of the trough 10 adjacent opposite sides of the receiver 24 are angle irons 44 which are supported adjacent their ends remote from the receiver 24 on legs 46. Carried by the angle irons 44 and extending therebetween is an arch 48 carrying intermediate the angle irons 44 a bearing 50 which aligns axially with the bearing 36, as will be readily understood upon reference to Figure 4.

Mounted for rotation in the bearings 36 and 50 is a horizontally extending shaft 52 carrying adjacent the bridge piece 34 a pinion 54 which has meshing engagement with a drive gear 56 which is fixed to the shaft 38 for rotation therewith adjacent the upper end thereof. Secured to the shaft 38 between the hub 40 and the drive gear 56 is a sprocket 58 carrying radially extending arms 60 which are adapted to be engaged by the links of the chain 14 in order to impart rotation to the shaft 38 when the chain 14 moves in the trough 10. Carried by the shaft 52 and extending radially outwardly therefrom are longitudinally spaced spokes 62 and 64 and carried by the spokes 62 and 64 in concentric spaced relation to the shaft 52 is a foraminous cylinder 66. Carried by the cylinder 66 and extending outwardly therefrom adjacent the spokes 64 is an annular flange 68. Paddles 70 are carried by the spokes 64 in outwardly spaced relation to the cylinder 66 and extend outwardly beyond the end of the cylinder 66 adjacent the spokes 64 for a purpose to be more fully hereinafter explained.

Supported on the angle irons 44 and extending in concentric spaced relation to the underside of the cylinder 66 is a semicircular trough 72 which terminates in spaced relation to the adjacent end of the receiver 24 and opens into a well 74 defined by an arcuate flange 76 carried by the trough 72 and extending outwardly therefrom which supports at its outer edge a substantially seimcircular wall 78 carrying in spaced relation to the flange 76 an inwardly extending arcuate wall 80 which is secured to the bottom 26 of the receiver 24, as will be readily understood upon reference to Figure 4. Carried by the cylinder 66 and extending outwardly therefrom adjacent the end thereof adjacent the receiver 24 is a ring 82 carrying buckets 84 which, as the cylinder 66 rotates, dip into the well 74 to collect and elevate feed deposited therein. Carried by the cylinder 66 and extending outwardly from the periphery thereof are helical vanes 86 which engage feed deposited in the trough 72 and advance it toward the well 74 and into the path of movement of the elevator designated generally 88 and defined by the flange 82 and the buckets 84. Carried by and extending inwardly into the cylinder 66 are helical vanes 90 which serve to advance bedding material such as shavings which are delivered into the cylinder 66 from the receiver 24 outwardly through the end of the cylinder 66 remote from the receiver.

Supported on the angle iron 44 on the side of the receiver 24 away from which the chain 14 moves is a chute 92 which inclines downwardly from a level about the axis of the shaft 52 toward and into the upper portion of the feed trough 10 so that as the elevator 88 rotates with the cylinder 66, the feed contained in the buckets 84 will be deposited in the chute 92 to be returned to the feed trough 10 immediately prior to the introduction of feed into the feed trough from the hopper 12. A suitable horizontally L-shaped guard 94 is carried by the angle iron 44 carrying the chute 92 and embraces the side of the chute remote from the elevator 88 and the back of the chute remote from the feed trough 10 to prevent the escape of feed discharged into the chute 92 by the elevator 88. A similar guard 96 is carried by the feed trough 10 adjacent the side of the elevator 88 remote from the chute 92 and partially embraces the elevator to prevent the spillage of feed from the buckets 84 as they move upwardly after having dipped into the well 74.

In use, it will be evident that as the chain 14 moves through the feed trough 10 in the direction of the arrows in Figure 1, the arms 60 of the sprocket will penetrate selected links of the chain to be moved in a circular path as the chain advances in a rectilinear path. The member 22 bridging the space between adjacent ends of the trough 10 will engage the outer edges of the scrapers 16 to cause the chain to move in a rectilinear path as it passes across the receiver and thereby assure engagement of the arms 60 by the chain. Thus, positive drive of the shaft 52 will be experienced. As the scrapers advance toward the receiver 24, feed and shavings engaged by said scrapers will be swept into the receiver by the scrapers and delivered by the arms 42 into the interior of the cylinder 66. Due to the rotation of the cylinder by the shaft 38 through the medium of the gears 52 and 54, it will be evident that the feed and shavings will be tumbled within the cylinder so as to be separated by the passage of the feed through the cylinder while the shavings and the like are advanced by the helical vanes 90 through the end of the cylinder remote from the receiver to be deposited in a pile adjacent the open end of the cylinder. Since the shavings tend to pile up adjacent the end of the cylinder through which they are delivered, the paddles 70 moving with the cylinder will tend to knock the top off of the pile and distribute the shavings so as to avoid interference with the discharge of shavings from the cylinder. The feed which falls through the perforations of the foraminous cylinder 66 will enter the well 74 and the space between the cylinder 66 and the arcuate trough 72 and as the cylinder rotates, the feed deposited in the trough 72 will be advanced toward the well 74 and deposited therein so that as the cylinder rotates, the buckets 84 of the elevator 88 will dip into the well and elevate the feed. The feed, of course, passes across the top of the cylinder 66 and is deposited in the chute 92 to be directed thereby into the feed trough 10 on the side of the separator remote from that approached by the feed and shavings. By locating the separator near the feed hopper 12 and on the side thereof toward which the chain 14 moves, it will be evident that the feed trough 10 will have been cleared of shavings and like material so that the full quantity of feed may be dispensed from the feed hopper 12 into the trough 10 to be distributed by the scrapers 16 throughout the length of the trough.

While in the foregoing there has been shown and described the preferred embodiment of this invention, it is to be understood that minor changes in the details of construction, combination and arrangement of parts may be resorted to without departing from the spirit and scope of the invention as claimed.

What is claimed is:

In apparatus for removing mixed feed and litter from a feed trough, separating the feed from the litter, and returning the feed to the trough, a separator structure comprising, in combination with a feed trough, a conveyor chain extending therein, and a depressed receiver in the trough open at one side: a rotary, foraminous separator drum having an inlet end opening into communication with said side of the receiver, said drum including a horizontal shaft extending laterally outwardly from the trough; a vertical shaft journalled in the receiver at the open side of the receiver; a rotary paddle secured to the vertical shaft and extending within the receiver and drum for transferring litter and feed from the receiver to the drum; a star wheel secured to the vertical shaft above the paddle in mesh with the chain for driving of the vertical shaft by the chain; a drive gear secured to the vertical shaft above the star wheel; and a driven gear secured to the drum shaft in mesh with the drive gear.

References Cited in the file of this patent
UNITED STATES PATENTS

| 23,965 | Vaughn | May 10, 1859 |
| 632,637 | Brooker | Sept. 5, 1899 |
| 1,386,298 | Winslow | Aug. 2, 1921 |
| 2,591,609 | Roberts et al. | Apr. 1, 1952 |
| 2,709,520 | Stark | May 31, 1955 |
| 2,742,020 | Smallegan | Apr. 17, 1956 |